Aug. 14, 1928.
L. H. THOEN
1,680,648
DIRIGIBLE WHEEL MOUNTING
Filed May 16, 1927    2 Sheets-Sheet 1
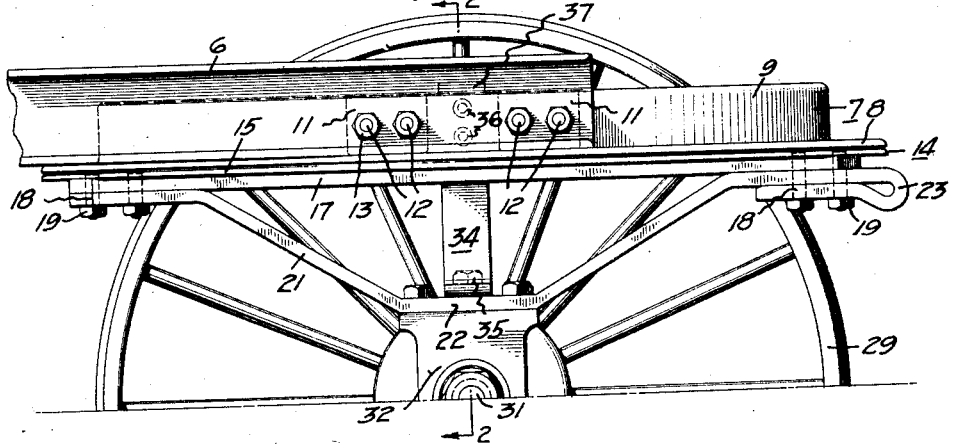
FIG.1.
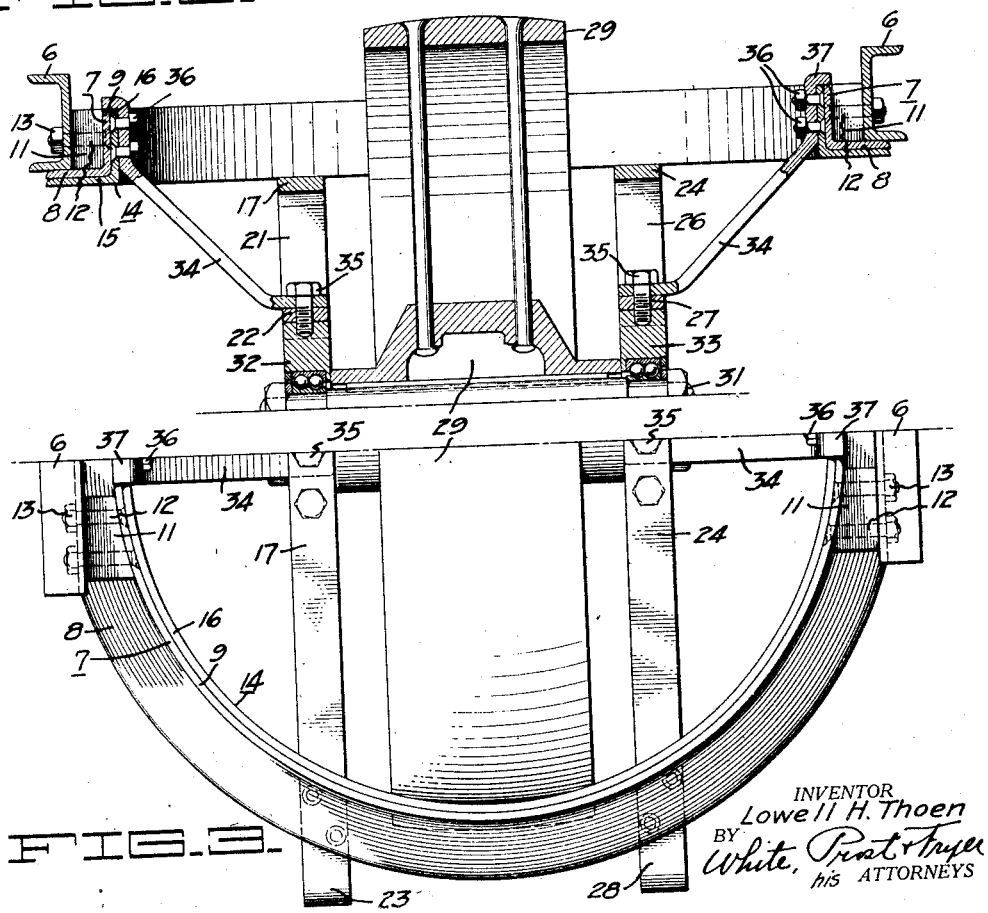
FIG.2.
FIG.3.
INVENTOR
Lowell H. Thoen
BY White, Prost & Fryer
his ATTORNEYS Aug. 14, 1928.
L. H. THOEN
1,680,648
DIRIGIBLE WHEEL MOUNTING
Filed May 16, 1927
2 Sheets-Sheet 2
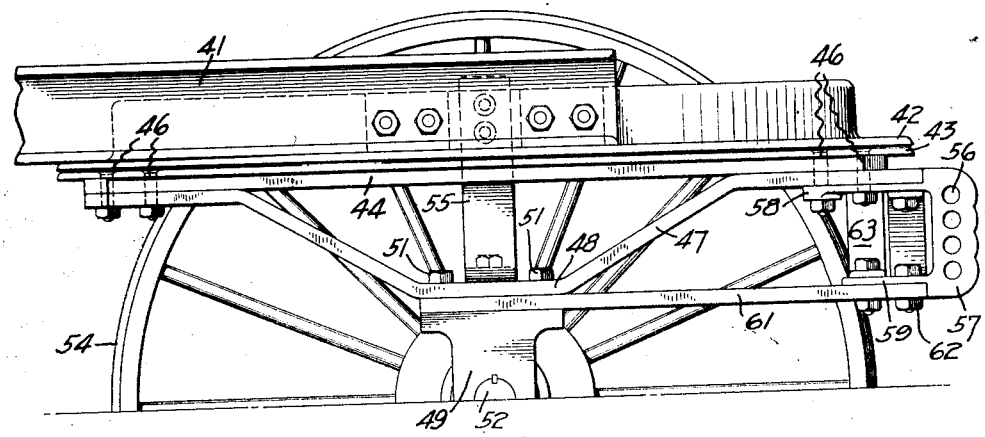
FIG.4.
FIG.5.
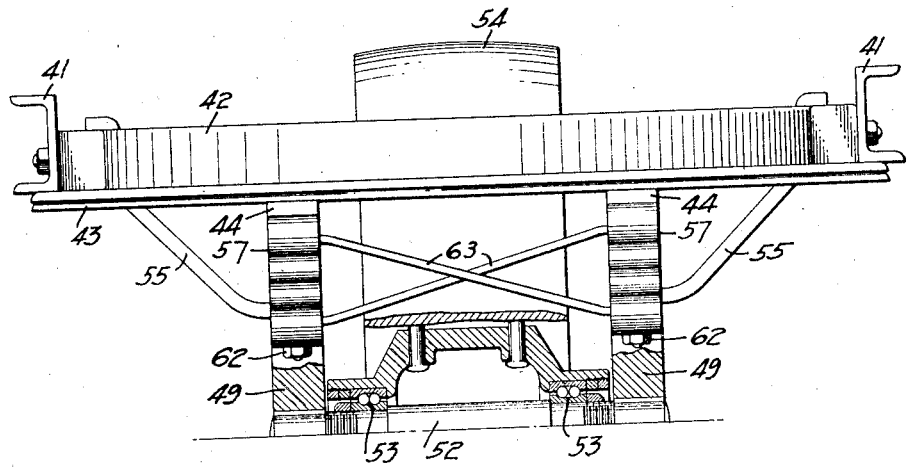
INVENTOR
Lowell H. Thoen
BY
White, Prost & Fryer
his ATTORNEYS Patented Aug. 14, 1928.

1,680,648

UNITED STATES PATENT OFFICE.

LOWELL H. THOEN, OF STOCKTON, CALIFORNIA, ASSIGNOR TO WESTERN HARVESTER CO., OF STOCKTON, CALIFORNIA, A CORPORATION OF CALIFORNIA.

DIRIGIBLE-WHEEL MOUNTING.

Application filed May 16, 1927. Serial No. 191,695.

My invention relates to wheels particularly adapted for use with harvesting machines and comparable vehicles and relates especially to a mounting for a dirigible wheel for effecting the steering of such a vehicle.

An object of my invention is to provide a strong, freely dirigible wheel.

Another object of my invention is to provide a dirigible wheel mounting which is well braced to withstand side thrust.

An additional object of my invention is to provide a mounting for a dirigible wheel on a vehicle adapted to be drawn by another vehicle.

My invention possesses other advantageous features, some of which with the foregoing, will be set forth at length in the following description where I shall outline in full that form of the dirigible wheel mounting of my invention, which I have selected for illustration in the drawings accompanying and forming part of the present specification. In said drawings I have shown one form of dirigible wheel mounting embodying my invention, but it is to be understood that I do not limit myself to such form, since the invention as set forth in the claims may be embodied in a plurality of forms.

In the drawings:

Fig. 1 shows in side elevation the forward part of a vehicle with my wheel mounting attached thereto, the lower half of the ground contacting wheel being omitted.

Fig. 2 is a cross section on the line 2—2 of Fig. 1, of the wheel mounting of my invention, the upper half of the ground contacting wheel being disclosed in elevation and the lower half of the wheel being omitted.

Fig. 3 shows in plan the forward half of the wheel mounting of my invention, the rear half being substantially symmetrical therewith.

Fig. 4 shows in side elevation the forward part of a vehicle with a modified form of my wheel mounting attached thereto, the lower half of the ground contacting wheel being omitted.

Fig. 5 is a front elevation of the modified form of wheel mounting shown in Fig. 4, portions being broken away to show the axle mounting.

The wheel mounting of my invention preferably comprises a turn table usually including a pair of nested angle irons on one of which a ground contacting wheel is mounted and to the other of which the vehicle frame is secured.

In one form of the invention, as disclosed in Figs. 1, 2 and 3 of the drawings, the vehicle frame preferably comprises a pair of frame members 6 which are preferably coplanar and substantially parallel. The frame members can conveniently be channels with the flanges turned outwardly. An exterior ring 7 is situated in a plane parallel with the frame members 6 and is advantageously an angle iron having a horizontal flange 8 and a substantially vertical flange 9. The angle iron 7 is given a circular contour and is united with the frame members 6 by spacers 11. There are preferably two spacers used at either side of the exterior ring 7. They are given a contour to conform at one side with the angle iron 7 and to the frame members 6 at the other side. Thru bolts 12 with suitable nuts 13 join the angle iron 7 and the frame members 6 as a unit.

In close contact with both flange 8 and flange 9 of the exterior angle iron 7, is an interior ring or angle iron 14 nested with angle iron 7 and which itself is provided with a substantially horizontal flange 15 and a vertical flange 16. The interior angle iron 14 is given a circular contour comparable to the contour of the exterior angle iron and the contacting surfaces of the two nested rings are preferably lubricated to facilitate their relative rotation.

Extending across the interior angle iron 14 and being disposed preferably parallel to a diameter thereof is a tie strip 17. The tie strip is preferably secured to the angle iron 14 by countersunk bolts 18 and their associated nuts 19. Also joined to the interior angle iron by the same nuts and bolts is a strap 21 which is in vertical alinement with the tie strip 17 but is offset intermediate its ends to form a pad 22 preferably parallel to the plane of the rings 7 and 14. The leading or forward end of the strap 21 is turned back upon itself to provide a loop or eye 23, and is secured by the bolt and nut 18 and 19 which secure the interior ring, the tie strap 17, and the strap 21 as a unit. A similar tie strip 24 is situated on the other side of the center of the interior angle iron 14 and preferably extends parallel to tie strip 17. In vertical registry with the tie strip 24 is a strap 26 in all respects similar to strap 21 and which also is provided with a pad 27. The forward end of strap 26 is likewise provided with an eye 28 so that the pair of eyes 23 and 28 form a draft hitch and are useful for the attachment of a towing vehicle, not shown.

A ground contacting wheel 29 is located with its plane preferably perpendicular to the plane of the nested angle irons 14 and 7 and is mounted on an axle 31 rotatably affixed in journals 32 and 33. Each of the journals is securely bolted to the pads 22 and 27 of the straps 21 and 26. While the axle 31 preferably lies in a plane containing a diameter of the nested rings, I can of course set it forwardly or rearwardly to provide a caster action. To aid in bracing the mounting for side thrust on the wheel 29, each of the pads 22 and 27 carries one end of a brace 34 which is secured thereto by means of a suitable bolt 35. The brace extends upwardly at an angle and bears against the vertical flange of the interior angle iron 14. It is secured thereto by means of suitable nuts and bolts 36. Side thrust of the wheel and of the frame 6 is thereby mutually transferred thru the braces 34.

In order to constrain upward axial movement of the exterior angle iron 7 with respect to the interior angle iron 14, the braces 34 are each extended upwardly and bent over to provide lugs 37 overlying the interior and exterior angle irons. The exterior angle iron is therefore confined between the lugs and the interior angle iron and is capable of rotational movement only.

The turn table provided by the two nested rings or angle irons can be made of relatively large diameter and is especially effective in withstanding side thrust, and thrusts from a rearward or forward direction. It also is capable of supporting a considerable vertical load. The vehicle to which the dirigible wheel is attached can easily be turned by a towing vehicle attached to the eyes 23 and 28.

In the modified form of my wheel mounting shown in Figs. 4 and 5, the frame members 41 rest on a pair of nested rings 42 and 43 respectively, which are relatively rotatable. The lower ring 43 carries a pair of transverse tie strips 44 parallel to a diameter of the ring and perforated to be secured thereto by suitable fastenings 46. Fastened to each tie strip and likewise secured to the ring 43 by the fastenings 46 is an offset strap 47. Each strap is formed to provide intermediate its length a pad 48 for the attachment of an axle block 49 by studs 51.
Preferably an axle shaft 52 is non-rotatably secured in the pair of blocks 49 and carries anti-friction bearings 53 on which a wheel 54 is journalled. Lateral strength of the mounting is increased by braces 55 which connect their respective axle blocks 49 with the lower ring 43 and are bent at their ends to constrain relative axial displacement of the rings.

Instead of reversing the straps 47 upon themselves to form a loop for hitching, I preferably provide in this modified form a plurality of hitching apertures 56 at various heights in each of two hitching blocks 57. The material of the blocks 57 can conveniently be cast iron and each block is provided with projecting lugs 58 and 59, the upper one of which is secured by the fastenings 46 and the lower one of which is joined to bar 61 by bolts and nuts 62. Each bar 61 is gripped between a strap 47 and an axle block 49 and transmits the propelling and turning force derived from the hitching blocks to the axle. A pair of braces 63 is fastened to the bars 61 and to the straps 47 to increase the transverse rigidity of the mounting.

I claim:

1. A dirigible wheel mounting comprising an angle iron of circular contour, a pair of parallel straps secured to and extending across said angle iron, a block secured to each of said straps, a wheel having an axle mounted in said blocks, braces secured to said blocks and to said angle iron, lugs on said braces radially overlying said angle iron, an exterior angle iron confined for rotational movement between said first angle iron and said lugs, and a frame secured to said exterior angle iron.

2. A dirigible wheel mounting comprising a pair of nested angle irons, a pair of frame members substantially coplanar with said angle irons, spacers between said frame members and said angle irons, means securing the exterior angle iron, said spacers, and said frame members together as a unit, a ground contacting wheel having an axle substantially parallel to the plane of said angle irons, a block at each end of said axle, straps for securing said blocks to the interior angle iron, and braces joining said blocks to the interior angle iron.

3. A dirigible wheel mounting comprising a pair of nested angle irons, a pair of frame members substantially coplanar with said angle irons, one of said frame members being disposed at each side of said angle irons, spacers between each of said frame members and the exterior angle iron, means for securing said frame members, spacers and exterior angle iron together as a unit, a wheel disposed in a plane perpendicular to the plane of said angle irons, an axle for said wheel, blocks for constraining said axle, a strap on one side of said wheel joining one of said blocks to the interior angle iron, a similar strap on the other side of said wheels, a brace extending substantially at right angles to the plane of said wheel and joining one of said blocks to the interior angle iron, a similar brace on the other side of said wheel, and lugs constraining relative axial movement of said angle irons.

4. A dirigible wheel mounting comprising an angle iron of circular contour, a pair of supporting straps secured to said angle iron, a wheel mounted on said straps, braces secured to said straps and to said angle iron, lugs on said braces overlying said angle iron, a second angle iron confined for rotation movement between said lugs and said first angle iron, and a frame secured to said second angle iron.

5. A dirigible wheel mounting comprising a pair of nested angle irons arranged for relative rotation; a frame secured to one of said angle irons, a wheel mounted on the other of said angle irons, and extended lugs constraining relative axial movement of said angle irons and forming braces for said wheel mounting.

6. A dirigible wheel mounting comprising a pair of nested angle irons arranged for relative rotation, a frame secured to one of said angle irons, a wheel mounted on the other one of said angle irons, and a draft hitch secured to the angle iron on which said wheel is mounted.

In testimony whereof, I have hereunto set my hand.

LOWELL H. THOEN.